United States Patent [19]

Amjad et al.

[11] Patent Number: 5,023,001

[45] Date of Patent: Jun. 11, 1991

[54] CALCIUM PHOSPHONATE SCALE INHIBITION

[75] Inventors: Zahid Amjad, Avon Lake; William F. Masler, III, Hinckley, both of Ohio

[73] Assignee: The B. F. Goodrich Company, Akron, Ohio

[21] Appl. No.: 397,628

[22] Filed: Aug. 23, 1989

Related U.S. Application Data

[63] Continuation of Ser. No. 177,719, May 23, 1988, abandoned, which is a continuation of Ser. No. 929,971, Nov. 3, 1986, abandoned.

[51] Int. Cl.$^5$ .............................................. C02F 5/14
[52] U.S. Cl. .................................. 210/699; 210/701; 252/180
[58] Field of Search ...................... 210/638, 698–701; 252/180, 181

[56] References Cited

U.S. PATENT DOCUMENTS

| | | | |
|---|---|---|---|
| 3,898,037 | 8/1975 | Lange et al. | 210/701 |
| 4,209,398 | 6/1980 | Ii et al. | 210/701 |
| 4,536,292 | 8/1985 | Matz | 210/701 |
| 4,566,973 | 1/1986 | Masler et al. | 210/701 |
| 4,634,523 | 1/1987 | Logan et al. | 210/701 |
| 4,640,793 | 2/1987 | Persinski et al. | 210/701 |
| 4,659,481 | 4/1987 | Chen | 210/701 |
| 4,711,725 | 12/1987 | Amick et al. | 210/701 |
| 4,744,949 | 5/1988 | Hoots et al. | 210/701 |
| 4,762,621 | 8/1988 | Masler et al. | 210/701 |
| 4,801,388 | 1/1989 | Fong et al. | 210/700 |
| 4,889,637 | 12/1989 | Amjad et al. | 210/701 |

*Primary Examiner*—Peter Hruskoci
*Attorney, Agent, or Firm*—Konrad H. Kaeding

[57] ABSTRACT

Addition of a secondary scale inhibitor is made to a water medium containing a primary phosphonate scale inhibitor to inhibit precipitation of insoluble calcium phosphonates which are formed by the reaction of calcium in the water medium with the primary scale inhibitor thus forming insoluble calcium phosphonate. The secondary scale inhibitor has the function of inhibiting precipitation of such insoluble calcium phosphonates. The secondary scale inhibitor is a copolymer of an acrylic acid and/or methacrylic acid with one or more of a principal comonomer selected from substituted acrylamides, alkoxyalkyl acrylates, substituted and unsubstituted alkyl acrylates, acrylamido alkane sulfonic acids, hydroxyalkyl acrylates, alkyl itaconates, and mixtures thereof.

1 Claim, No Drawings

CALCIUM PHOSPHONATE SCALE INHIBITION

This is a continuation of copending application Ser. No. 07/177,719 filed on May 23, 1988, now abandoned, which is a continuation of Ser. No. 06/929,971, filed on Nov. 13, 1986, now abandoned.

BACKGROUND OF THE INVENTION

Most industrial waters contain alkaline earth metal cations such as calcium, barium, magnesium, etc., and several anions such as bicarbonate, carbonate, sulfate, phosphate, silicate, fluoride, etc. When combinations of these anions and cations are present in concentrations which exceed the solubility of their reaction products, precipitates form until these product solubility concentrations are no longer exceeded. For example, when the ionic product of calcium and carbonate exceeds the solubility of calcium carbonate, a solid phase of calcium carbonate will form.

Solubility product concentrations are exceeded for various reasons such as partial evaporation of the water phase, change in pH, pressure or temperature, and the introduction of additional ions which form insoluble compounds with the ions already present in the solution.

As these reaction products precipitate on surfaces of the water-carrying system, they form scale or deposits. This accumulation prevents effective heat transfer, interferes with fluid flow, facilitates corrosive processes, and harbors bacteria. This scale is an expensive problem in many industrial water systems, such as recirculating cooling water systems in cooling towers, in that the scale causes delays and shutdowns for cleaning and removal of the scale.

Desalination of saline or brakish water can be accomplished by means of reverse osmosis. In its simplest form, osmosis uses a membrane which is semi-permeable to water but which rejects certain dissolved salts. If pure water is separated by a semi-permeable membrane from a salt solution, pure water will flow through the membrane to the salt solution side until osmotic equililbrium is reached. However, if positive pressure is applied to the salt solution to overcome the osmotic pressure, the flow will be reversed and water will flow from the salt solution through the membrane to the pure water side. This is what is meant by reverse osmosis.

In a reverse osmosis water purification system, impure water is pumped under high pressure into the system where it contacts the membrane. The product water is 95-99% free of dissolved minerals.

The continued efficiency of a reverse osmosis system depends on the maintenance of the membrane in an unfouled condition. A critical problem experienced by this system is fouling of the membrane by precipitation of scale. It is, therefore, desirable to prevent scale buildup or to prolong the time between membrane changes by reducing scale precipitation in the water stream that is passed through a reverse osmosis system.

Primary scale inhibiting compounds have been added in the past in treatment of water to inhibit precipitation of scales, particularly calcium carbonate. Examples of such primary scale inhibiting compounds include amino phosphonic acids and phosphonates, diphosphonic acids, phosphonoalkane tricarboxylic acids, polyphosphoric acids, polyol phosphate esters, maleic anhydride copolymers, acrylic polymers, and others. Although the above primary scale inhibiting compounds may be excellent scale inhibitors for calcium carbonate scale, they can form insoluble precipitates under conditions encountered in water treatment, particularly cooling water and reverse osmosis systems. The insoluble precipitates that are formed are calcium salts of scale inhibitors, i.e. Ca-phosphonates, which are frequently formed at normal use—concentrations of primary scale inhibitors.

SUMMARY OF THE INVENTION

This invention relates to treatment of a water medium containing calcium ions by addition thereto of an effective threshold inhibition amount of a primary phosphonate scale inhibitor which has the function of inhibiting precipitation of calcium carbonate scale and an effective threshold amount of a secondary scale inhibitor which has the function of inhibiting precipitation of insoluble calcium phosphonates which are formed by the reaction of calcium in the water medium and the primary phosphonate scale inhibitor This invention also pertains to the composition itself and to addition of the secondary scale inhibitor to a water medium containing calcium ions and the primary phosphonate scale inhibitor to inhibit or reduce precipitation of insoluble calcium phosphonates.

DETAILED DESCRIPTION OF THE INVENTION

The primary phosphonate scale inhibitors have been added in the past to inhibit precipitation of certain scales in water systems. Calcium carbonate is an example of such a scale. However, it was discovered that the primary scale inhibitors, under certain conditions, reacted with calcium in the water and formed insoluble calcium phosphonates. This was undesirable since the insoluble calcium phosphonates constituted an additional scaling problem and the reduction of the primary scale inhibitor contributed to the accelerated formation of other scales, precipitation of which was to be inhibited thereby.

This invention is directed to treatment of an aqueous medium to inhibit or reduce precipitation of insoluble calcium phosphonates which are formed at a sufficiently high concentration of the primary phosphonate scale inhibitor. The primary phosphonate inhibitors are added to aqueous media to inhibit precipitation of scale-forming salts, such as calcium carbonate. However, when an excess amount of the primary scale inhibitor is present at certain conditions, insoluble calcium phosphonates are formed which precipate out of the solution. Precipitation of insoluble calcium phosphonate can also occur in the presence of high levels of calcium at conditions which promote formation of the insoluble calcium phosphonates in aqueous media containing the primary phosphonate scale inhibitors. It should be apparent that depletion of the primary scale inhibitor due to its reaction to form the insoluble calcium phosphonate salts, can result in a rapid formation of the other scales for which the primary scale inhibitor was intended, such as calcium carbonate.

The insoluble calcium phosphonate salts, unless inhibited, precipitate out in a water medium and are a source of problems in cooling water and in desalination processes. In a cooling tower and distillation, the calcium phosphonates deposit on heat exchange surfaces and thus create problems associated with scale deposits, as already described. In desalination by reverse osmosis, calcium phosphonates can deposit on the semi-permeable membranes requiring premature removal and cleaning the membranes.

The calcium phosphonates of interest here are water-insoluble salts which are formed by the reaction of calcium in water with a phosphonate of the primary phosphonate scale inhibitor. An example of one such salt is calcium phosphonate of hydroxyethylidene diphosphonic acid or HEDP which has the following formula:

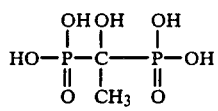

The calcium phosphate salt of HEDP is one where one or more of the hydrogens of the phosphonic acid groups is replaced with a calcium atom.

In a preferred embodiment, the invention disclosed herein pertains to treatment of cooling water in cooling towers and to treatment of water in desalination processes by means of reverse osmosis and distillation where it is desired to inhibit precipitation of scales in a water medium passing through either a distillation apparatus or a semi-permeable membrane. In treatment of water in a cooling tower and in a desalination process, the objective is to inhibit precipitation of insoluble calcium salts, such as calcium carbonate and calcium sulfate, which otherwise would foul heat exchange surfaces and the semi-permeable membranes used in reverse osmosis.

A secondary scale inhibitor is used herein to inhibit precipitation of water-insoluble calcium phosphonate scales which can be formed by the reaction of calcium in water with the primary phosphonate scale inhibitor. The secondary scale inhibitors are copolymers of a preponderant proportion of an acrylic acid with a lesser amount of one or more copolymerizable comonomers, which copolymers have the capacity to inhibit precipitation or formation of insoluble calcium phosphonate salts.

The primary scale inhibitors are well known in the art and they are disclosed and used herein for their known and intended function. Although the secondary scale inhibitors are known for their scale inhibition of calcium phosphate scale, they are not known for their scale inhibition of calcium phosphonate salts, for which they are used herein.

The relative weight ratio of the primary scale inhibitor to the secondary scale inhibitor can vary from 100:1 to 1:100, preferably 5:1 to 1:5. Molecular weight of the secondary scale inhibitor, which are copolymers of an acrylic acid, is in the range of 1,000 to 50,000 but preferably in the range of 5,000 to 20,000. Molecular weight is weight average measured by gel permeation chromatography. Amount of the secondary scale inhibitor can vary from 0.05 to 500 ppm but preferably from 0.1 to 50 ppm. Temperature of the water medium to be treated with the secondary scale inhibitor can be in the range from its freezing point to its boiling point, preferably 10° to 80° C.

The primary phosphonate scale inhibitors contemplated herein include amino phosphonic acids and phosphonates, diphosphonic acids, phosphono tricarboxylic acids, polyphosphoric acids, and polyol phosphate esters.

Certain organophosphorous compounds, such as aminomethylene phosphonic acid, N-substituted aminomethylene phosphonic acids, and both N- and C-substituted aminomethylene phosphonic acids, can be employed as the primary amino phosphonic acid scale inhibitors. These compounds can be prepared pursuant to the disclosure of U.S. Pat. No. 3,288,846. Generally, such compounds can be characterized as containing at least one N—C—P linkage in their molecules, and have the following structural formula:

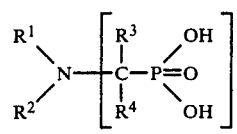

wherein $R^3$ and $R^4$ are individually selected from hydrogen and organic radicals, preferably hydrogen; $R^1$ and $R^2$ are individually selected from hydrogen, organic radicals, and alkylene phosphonic radicals, such as are within the brackets, above. Salts of the above compounds can also be used. Examples of this group of compounds include aminotri (methylene phosphonic acid) and the potassium salt of hexamethylenediamine tetra (methylene phosphonic acid).

Certain hydroxyalkane -1, 1- diphosphonic acids described in U.S. Pat. No. Re 28,553 are useful scale inhibitors. Preferred compounds in this group are defined by the following structural formula:

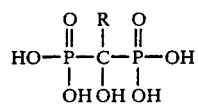

wherein R is a lower alkyl radical of 1 to 5 carbon atoms. The OH groups can be in esterified form and two or more molecules can be converted to corresponding anhydrides. An especially useful compound in this group is 1 - hydroxyethylethane -1, 1- diphosphonic acid, also referred to as HEDP.

Certain of the phosphono acids disclosed in U.S. Pat. No. 3,886,205 can be used as the primary scale inhibitors. These compounds are generally defined as follows:

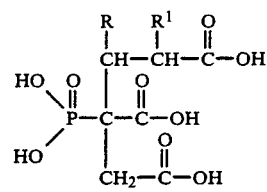

wherein R can be hydrogen, lower alkyl of 1 to 5 carbons or carboxyl and $R^1$ can be hydrogen or methyl. Alkali metal, ammonium or amine salts of the above compounds are also suitable. These compounds are also referred to herein as phosphonoalkane diand tricarboxylic acids containing 2 to 6 carbon atoms in the alkane group. The above compounds have a strong complex-forming effect on alkaline earth metal ions. An especially effective compound in this group is 2 - phosphonobutane -1, 2, 4 - tricarboxylic acid.

Useful polyphosphoric acid scale inhibitors are also disclosed by U.S. Pat. No. 2,358,222. This group of polyphosphoric acid compounds include pyrophosphates, metaphosphates, and complex phosphates. The polyphosphates, such as pyrophosphates, triphosphate, tetraphosphate, hexametaphosphate, and complex phosphate, are generally derived by molecular dehydration of orthophosphoric acid compounds. The polyphosphates can be used alone or with a protective compound selected from the tannins, gelatin, starch and lignin.

The polyolphosphate esters contain one or more 2-hydroxyethyl groups and one or more of the following groups:

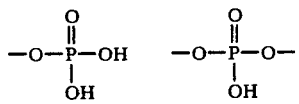

and salts thereof. Preparation of such compounds is disclosed in U.S. Pat. No. 3,462,365, of which, glycerine phosphate esters are preferred. Also included in this group of compounds are the phosphated mixed esters of non-surface active polyols containing at least one hydroxyethyl group and monohydric surface active compounds containing oxyethylene groups, described in U.S. Pat. No. 3,723,420.

The amino phosphonates useful as scale inhibitors are defined as follows:

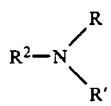

where R is

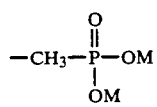

and
$R^1$ is R or $-CH_2CH_2OH$ and $R^2$ is R, $-CH_2CH_2OH$ or

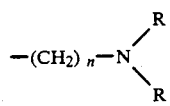

where M is H, $NH_4$, alkali metal, or a combination thereof, and n is 1 to 6. Such compounds are described in U.S. Pat. No. 3,336,221. Other useful amino phosphonates are described in U.S. Pat. No. 3,434,969.

The secondary scale inhibitors are copolymers of an acrylic acid and an effective amount of at least one other copolymerizable monomer. Such copolymers are effective as threshold inhibition agents against calcium phosphonates which can be formed by the reaction of calcium and the primary phosphonate scale inhibitor. Amount of an acrylic acid in such copolymers can vary from 40 to 99 weight parts, with 1 to 60 weight parts being one or more copolymerizable monomers. In a preferred embodiment, amount of an acrylic acid can vary from 50 to 95 weight parts, on the basis of 100 weight parts of the copolymer.

Suitable acrylic acids for purposes herein are generally defined as monounsaturated monocarboxylic acids of 3 to 4 carbon atoms. Specific examples of such acrylic acids include acrylic acid and methacrylic acid, with acrylic acid being preferred. Acrylic and methacrylic acids can be used together, however, as between these two acids, amount of acrylic acid is predominant, meaning that amount of acrylic acid exceeds amount of methacrylic acid, on weight basis.

The acid units in the copolymer can be in the acid form or in a neutralized form where the hydrogen of the carboxyl group is replaced with an alkali metal, alkaline earth metal, or an ammonium cation, depending on the neutralizing medium. Generally, the copolymers can be neutralized with a strong alkali, such as sodium hydroxide, in which instance, the hydrogen of the carboxyl group of the acrylic acid units will be replaced with a sodium. With the use of an amine neutralizing agent, the hydrogen will be replaced with an ammonium group. Useful copolymers include copolymers that are unneutralized, partially neutralized, and completely neutralized.

Suitable copolymers contain polymerized units of one or more principal comonomers selected from substituted and unsubstituted acrylamides, substituted and unsubstituted alkyl acrylates and methacrylates, alkoxyalkyl acrylates and methacrylates, acrylamido alkyl sulfonic acids and carboxylic acids, hydroxylalkyl acrylates and methacrylates, alkyl itaconates, styrene sulfonic acids and salts thereof, allyloxy hydroxyalkane sulfonic acids and their salts, and maleic acid, its anhydride, and salts of maleic acid. Other monomers can be polymerized with an acrylic acid and at least one principal comonomer.

Copolymers of an acrylic acid and a substituted acrylamide contain the following substituted acrylamide repeating unit:

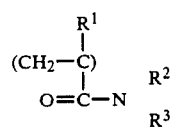

where $R^1$ is hydrogen or methyl, and $R^2$ and $R^3$ are individually selected from hydrogen, alkyl and substituted alkyl groups each containing a total of 1 to 8 carbon atoms, provided that both $R^2$ and $R^3$ are not hydrogen although either can be a hydrogen atom. Substituents on the $R^2$ and $R^3$ groups include alkyl, aryl, carboxylic acid, and keto groups, however, in a preferred embodiment, $R^2$ and $R^3$ are individually selected from unsubstituted alkyl groups of 2 to 6 carbon atoms and substituted alkyl groups of 1 to 8 carbon atoms containing a keto or a sulfo substituent group. Specific examples of preferred principal substituted acrylamide comonomers include t-butyl acrylamide, isopropyl acrylamide, isobutyl acrylamide, dimethyl acrylamide, t-octyl acrylamide, and diacetone acrylamide.

Suitable principal comonomers also include alkoxyalkyl acrylates, which can be defined as follows:

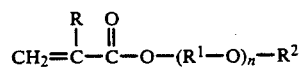

where R is hydrogen or methyl; $R^1$ is a lower alkyl radical of 1 to 6 carbon atoms, preferably 2 to 4; $R^2$ is also a lower alkyl radical of 1 to 6 carbon atoms, preferably 2 to 4; and n is a number from 1 to 6, preferably 2 to 4. It should be apparent that more than one alkoxy group is contemplated in these principal comonomers.

Certain of the alkoxyalkyl acrylates are presently available in commercial quantities. One such monomer is CA monomer which is available from Sartomer Chemical Company as SR-256 (carbitol acrylate) and is 2 - (2-ethoxyethoxy) ethyl acrylate. In this comonomer, there are two alkoxy or ethoxy groups and the alkyl group is ethyl. Other commercial alkoxy alkyl acrylates include methoxyethylacrylate and ethoxyethylmethacrylate.

The acrylamidoalkane sulfonic acids are defined as follows:

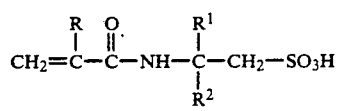

where R is hydrogen or methyl, and $R^1$ and $R^2$ are individually selected from hydrogen or alkyl groups of 1 to 4 carbon atoms.

The hydroxyalkyl acrylates are well known. Polymers incorporating hydroxyalkyl acrylates are prepared by polymerizing an acrylic acid and an hydroxylated lower alkyl acrylate in the mole ratio of 34:1 to 1:34 preferably 11:1 to 1:2. The polymers can also be prepared by reacting a polyacrylic acid, or a derivative thereof, with an alkylene oxide of 2 to 6 carbon atoms. These polymers are characterized by the presence of the following repeating units:

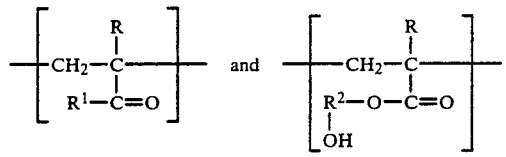

where R is hydrogen or a lower alkyl of 1 to 3 carbon atoms; $R^1$ is OH, $NH_2$ or OM where M is a water-soluble cation; $R^2$ is a lower alkyl of about 2 to 6 carbon atoms. Molecular weight of these water-soluble polymers is in the approximate range of 500 to one million, preferably 1,000 to 500,000.

The polymers containing hydroxyalkyl acrylates can be prepared by vinyl addition polymerization or by treatment of an acrylic acid polymer with an alkylene oxide. Acrylic acid, derivatives thereof or their water-soluble salts, can be copolymerized with a hydroxyalkyl acrylate under standard copolymerization conditions using free radical initiators such as benzoyl peroxide, azobisisobutyronitrile, or redox initiators such as ferrous sulfate and ammonium persulfate.

The hydroxyalkyl acrylates can also be prepared by the addition reaction of acrylic acid and an alkylene oxide. For instance, acrylic acid can be reacted with propylene oxide to obtain the hydroxypropyl acrylate monomer.

The alkyl itaconates are also suitable as principal comonomers. Polymers of the alkyl itaconates contain repeating units having the following structure:

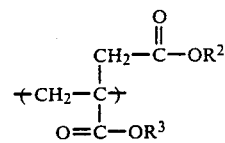

where $R^2$ and $R^3$ are individually selected from hydrogen, alkyl and substituted alkyl groups of 1 to 12 carbon atoms in the alkyl group, provided that both $R^2$ and $R^3$ are not hydrogen although either $R^2$ or $R^3$ can be hydrogen. Substituents on the $R^2$ and $R^3$ groups include lower alkyl, aryl such as phenyl, an keto groups, however, in a preferred embodiment, $R^2$ and $R^3$ are individually selected from unsubstituted lower alkyl groups of 1 to 6 carbon atoms. Specific examples of preferred $R^2$ and $R^3$ groups include methyl, ethyl, propyl, isopropyl, butyl and isomeric forms thereof, and the like. Preferred herein are the diesters of itaconic acid. Specific examples of preferred itaconic acid esters include dimethyl itaconate, diethyl itaconate and dibutyl itaconate.

The invention disclosed herein is now illustrated with specific examples which demonstrate the use of particular scale inhibiting compositions to inhibit or to reduce precipitation or formation of calcium phosphonate scale. Such scale is formed by the reaction of calcium in an aqueous system with a phosphonate from a scale inhibiting composition which was added to inhibit precipitation of calcium carbonate scale.

EXAMPLE I

This example demonstrates effectiveness of the scale inhibiting compositions against calcium phosphonate scale.

The procedure in this experiment involved the preparation of a supersaturated solution of calcium phosphonate containing varying levels of the scale inhibiting polymers. The solution contained 150 ppm of calcium ions, 266 ppm of chloride ions, 60 ppm of bicarbonate ions, and 22 ppm of sodium ions. The solution also contained 15 ppm of 1 - hydroxyethane - 1, 1 - diphosphonic acid, or HEDP, as the primary scale inhibitor. The pH of the solution was adjusted to 8.5 with dilute sodium hydroxide and the solution was stored in a water bath maintained at 50° C. Static test conditions were employed. After 20 hours in the test, the solutions were filtered through a 0.22 micron filter paper and the phosphonate was analyzed by the standard colorimetric method which involved oxidation of the phosphonate by persulfate in accordance with procedure outlined in a Special Report No. 7823 dated Jan. 7, 1972, by Monsanto Industrial Chemicals Company.

The results are given in Table I, below. The secondary scale inhibitors had weight average molecular weight of about 10,000. Amount of the secondary inhibitor was 10 ppm in each experiment. Amount of HEDP primary scale inhibitor at beginning of the test at time of zero (t=0) was 15 ppm and at the end of test at time of 20 hours (t=20) was as indicated. Here, higher numbers at t=20 indicate greater efficiency of the inhibitors.

TABLE I

| Comp. of Sec. Scale Inhibitor | Phosphonate In Soln. at t = 20 hrs. |
| --- | --- |
| None | 5.3 |
| AA:MAA:t-BuAm 60:20:20 | 14.1 |
| AA:MAA:CA:Am | 9.5 |

TABLE I-continued

| Comp. of Sec. Scale Inhibitor | Phosphonate In Soln. at t = 20 hrs. |
|---|---|
| 54:21:16:9 AA:AMPS | |
| 70:30 | 13.0 |

The following contractions appear in the above table:
AA = acrylic acid
MAA = methacrylic acid
t-BuAm = tertiary butyl acrylamide
CA = 2-(2-ethoxyethoxy)ethyl acrylate
AMPS = 2-acrylamido-2-methylpropane sulfonic acid

EXAMPLE II

Additional tests were carried out pursuant to the procedure of Ex. 1 for evaluation of additional secondary scale inhibitors (Mw = 10,000) to reduce precipitation of calcium phosphonate. Results are given in Table II, below, in terms of percent threshold inhibition (%TI). Values of %TI in excess of about 40 are considered good. The % TI was calculated in a conventional manner.

TABLE II

| Polymer | % Comp. | % TI |
|---|---|---|
| AA | 100 | 0 |
| AA:iPrAm | 80:20 | 34 |
| AA:iPrAm | 70:30 | 92 |
| AA:iPrAm | 60:40 | 94 |
| AA:tBuAm | 80:20 | 62 |
| AA:DAAm | 70:30 | 45 |
| AA:AMPS | 80:20 | 2 |
| AA:AMPS | 70:30 | 55 |
| AA:AMPS | 51:49 | 97 |
| AMPS | 100 | 4 |
| AA:SEM | 80:20 | 65 |
| AA:DMI | 70:30 | 88 |
| AA:DMI | 60:40 | 70 |
| AA:MAA:SSS | 60:20:20 | 6 |
| AA:CA:AMPS | 75:15:10 | 91 |
| AA:HPA | 63:37 | 58 |
| AA:iPrAm:AMPS | 70:20:10 | 94 |
| AA:iPrAm:AMPS | 60:20:20 | 91 |
| AA:tBuAM:AMPS | 70:20:10 | 88 |
| AA:tBuAM:AMPS | 60:20:20 | 87 |
| AA:AMPS:HPA | 65:5:30 | 94 |
| AA:AMPS:HPA | 60:5:35 | 96 |
| AA:AMPS:HPA | 80:10:10 | 63 |
| AA:AMPS:HPA | 60:10:30 | 95 |
| AA:AMPS:MMA | 60:20:20 | 91 |
| AA:AMPS:EMA | 60:20:20 | 95 |
| AA:AMPS:HEA | 60:10:30 | 91 |
| AA:AMPS:CA | 60:20:20 | 90 |
| AA:AMPS:MeOEA | 60:20:20 | 92 |
| AA:MAA:CA:AMPS | 54:21:16:9 | 85 |
| AA:MAA:Am:CA | 54:21:9:16 | 39 |
| AA:MAA:tBuAm | 60:20:20 | 91 |
| AA:VOAc | 80:20 | 0 |
| AA:VOAc | 70:30 | 2 |
| AA:VOH | 70:30 | 1 |
| AA:VOAc:AMPS | 60:10:30 | 98 |
| AA:VOH:AMPS | 60:10:30 | 93 |
| AA:VOAc:AMPS | 50:20:30 | 100 |
| AA:VOH:AMPS | 50:20:30 | 98 |
| AA:VOAc:AMPS | 60:20:20 | 55 |
| AA:VOH:AMPS | 60:20:20 | 36 |
| AA:VOAc:AMPS | 70:20:10 | 6 |

The following contractions appear in the above table:

| AA | = | acrylic acid |
|---|---|---|
| MAA | = | methacrylic acid |
| Am | = | acrylamide |
| t-BuAm | = | tertiary butyl acrylamide |
| CA | = | 2-(2-ethoxyethoxy)ethyl acrylate |
| AMPS | = | 2-acrylamido-2-methyl propane sulfonic acid |
| SEM | = | sulfoethyl methacrylate |
| HEA | = | hydroxyethyl acrylate |
| MeOEA | = | methoxyethyl acrylate |
| VOAc | = | vinyl acetate |
| VOH | = | vinyl alcohol |
| DAAm | = | diacetone acrylamide |
| SSS | = | sodium styrene sulfate |
| HPA | = | hydroxypropyl acrylate |
| DMI | = | dimethyl itaconate |
| iPrAm | = | N-isopropyl acrylamide |
| MMA | = | methyl methacrylate |
| EMA | = | ethyl methacrylate |

EXAMPLE III

This example also demonstrates threshold inhibition of certain secondary scale inhibitors against calcium phosphonate scale over an extended period of time.

The test solution herein contained 150 ppm of calcium ions, 60 ppm of bicarbonate ions, 23 ppm of sodium ions, 266 ppm of chloride ions, 10 ppm of the secondary scale inhibitor copolymer and 15 ppm of HEDP. Molecular weight of the secondary scale inhibitors was about 10,000. The solution was maintained at 50° C. and was adjusted to pH of 8.5. Readings were taken at end of day 1, day 3, and day 7. Results are given in Table III, below:

TABLE III

| Exp. No. | Composition of Copolymer | % Threshold Inhibition | | |
|---|---|---|---|---|
| | | Day 1 | Day 3 | Day 7 |
| | AA:AMPS | | | |
| 1 | 80:20 | 2 | 0 | 0 |
| 2 | 70:30 | 55 | 58 | 33 |
| 3 | AA:t-BuAm:AMPS 60:20:20 | 75 | 73 | 78 |
| 4 | AA:t-BuAm:MAA 60:20:20 | 75 | 38 | 19 |
| 5 | AA:t-BuAm:AMPS:MAA 60:10:10:20 | 88 | 77 | 65 |
| 6 | AA:MAA:AMPS:CA 54:21:9:16 | 86 | 81 | 86 |
| 7 | AA:MAA:Am:CA 54:21:9:16 | 39 | 10 | 5 |

The following contractions appear in the above table:
AA = acrylic acid
MAA = methacrylic acid
t-BuAm = tertiary butyl acrylamide
AMPS = 2-acrylamido-2-methylpropane sulfonic acid
CA = 2-(2-ethoxyethoxy)ethyl acrylate (same as carbitol acrylate)
Am = acrylamide Table III demonstrates effectiveness of calcium phosphonate inhibition by the copolymers of acrylic acid and AMPS; acrylic acid, t-butyl acrylamide, and AMPS; acrylic acid, t-butyl acrylamide, AMPS and methacrylic acid; and acrylic acid, methacrylic acid, AMPS, and CA. Copolymers containing phosphino groups can also be used. Such material is available commercially as Belclene-400 and contains AMPS, acrylic acid and phosphino groups. The phosphino groups are characterized as having the following structures:

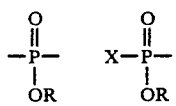

where X is hydrogen or hydroxyl group and R is hydrogen, alkyl or alkali metal or ammonium group.

It has been shown herein that a combination of a primary phosphonate scale inhibitor and a secondary scale inhibitor is effective in inhibiting scaling caused by water-insoluble scale, such as calcium phosphonate. Molecular weight of the tested secondary scale inhibitors, as weight average molecular weight, was in the range of about 5,000 to 20,000. It should be understood the secondary scale inhibitors outside this range are also suitable.

I claim:

1. In a water treatment system using a phosphonate to inhibit calcium scale, a method for preventing said phosphonate from forming a calcium phosphonate scale, said method comprising:

adding to the water system a calcium phosphonate scale inhibiting copolymer wherein the weight amount of the phosphonate scale inhibiting copolymer relative to the weight amount of phosphonate in the water system is in the range of about 5:1 to about 1:5;

said calcium phosphonate scale inhibiting copolymer comprising a first, a second and a third comonomer, wherein:

the first comonomer is acrylic acid, methacrylic acid, salts of said acids, or a combination thereof;

the second comonomer is 2-acrylamido-2-methyl propane sulfonic acid, a salt of said acid or a combination thereof;

the third comonomer is a member of the group consisting of tertiary butyl acrylamide, 2-(2-ethoyxethoxy)ethyl acrylate, hydroxyethyl acrylate, methoxyethyl acrylate, hydroxypropyl acrylate, N-isopropyl acrylamide, methyl methacrylate, ethyl methacrylate and combinations thereof; wherein the ratio of the first, second and third comonomer in weight parts is 50-80:5-30:10-30, wherein the weight average molecular weight of the calcium phosphonate scale inhibiting polymer is in the range of about 1,000-50,000.

* * * * *